United States Patent
Levanon et al.

(10) Patent No.: US 7,398,213 B1
(45) Date of Patent: Jul. 8, 2008

(54) METHOD AND SYSTEM FOR DIAGNOSING PATHOLOGICAL PHENOMENON USING A VOICE SIGNAL

(75) Inventors: Yoram Levanon, Ramat Hasharon (IL); Lan Lossos-Shifrin, Zur Hadasah (IL)

(73) Assignee: Exaudios Technologies, Ramat-Gan (IL)

( * ) Notice: Subject to any disclaimer, the term of this patent is extended or adjusted under 35 U.S.C. 154(b) by 0 days.

(21) Appl. No.: 11/383,634

(22) Filed: May 16, 2006

Related U.S. Application Data

(60) Provisional application No. 60/681,473, filed on May 17, 2005.

(51) Int. Cl.
*G10L 21/06* (2006.01)
(52) U.S. Cl. .................... 704/271; 704/261
(58) Field of Classification Search .......... 704/271, 704/261
See application file for complete search history.

(56) References Cited

U.S. PATENT DOCUMENTS

| | | | |
|---|---|---|---|
| 6,749,565 B2 * | 6/2004 | Chudner | 600/300 |
| 7,092,874 B2 * | 8/2006 | Clavbo | 704/207 |
| 2003/0036903 A1 * | 2/2003 | Konopka et al. | 704/249 |
| 2003/0078768 A1 * | 4/2003 | Silverman et al. | 704/206 |
| 2003/0114381 A1 * | 6/2003 | Cotanche et al. | 514/12 |
| 2006/0110022 A1 * | 5/2006 | Zhang et al. | 382/132 |
| 2006/0122826 A1 * | 6/2006 | Jiang et al. | 704/205 |
| 2006/0177799 A9 * | 8/2006 | Stuart et al. | 434/112 |
| 2006/0253278 A1 * | 11/2006 | Furst-Yust et al. | 704/209 |
| 2007/0203532 A1 * | 8/2007 | Tass et al. | 607/45 |

\* cited by examiner

*Primary Examiner*—David R. Hudspeth
*Assistant Examiner*—Jakieda R Jackson
(74) *Attorney, Agent, or Firm*—Greenberg Traurig, LLP

(57) ABSTRACT

The present invention relates to a method and system for diagnosing pathological phenomenon using a voice signal. In one embodiment, the existence of at least one pathological phenomena is determined based at least in part upon a calculated average intensity function associated with speech from the patient. In another embodiment, the existence of at least one pathological phenomena is determined based at least in part upon the a calculated maximum intensity function associated with speech from the patient.

23 Claims, 12 Drawing Sheets

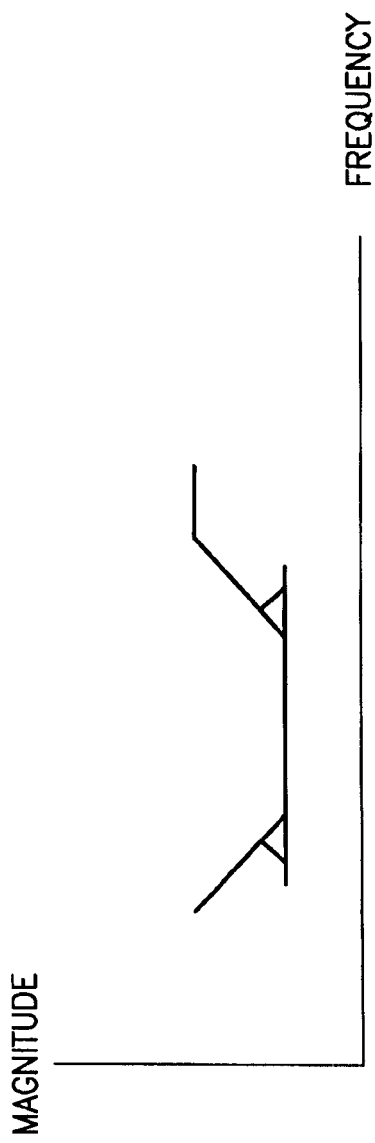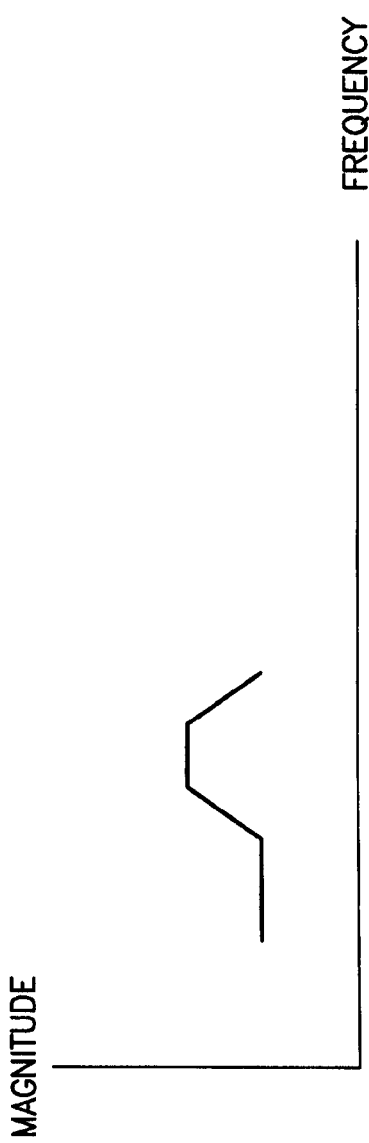

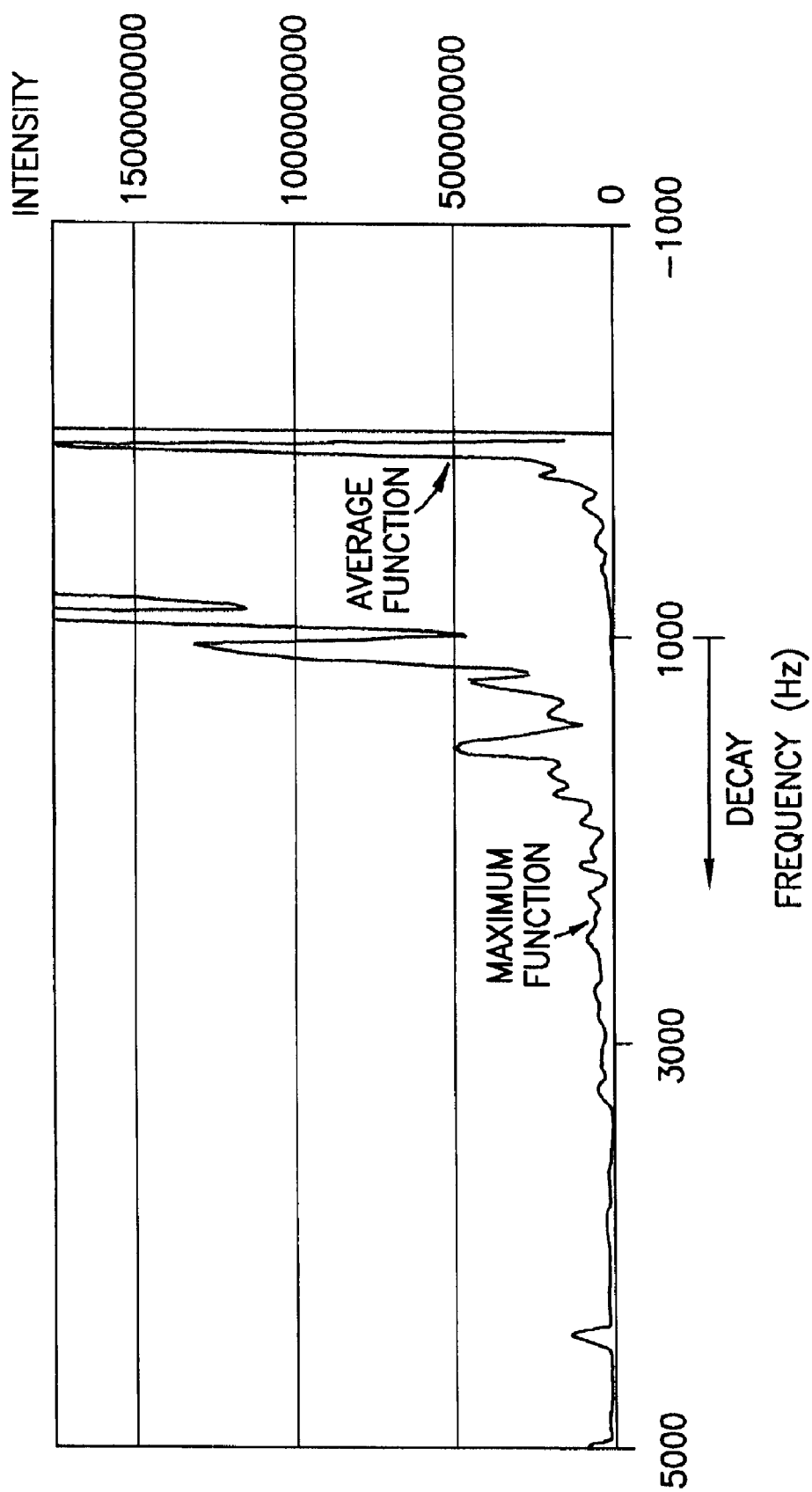

METHOD AND SYSTEM FOR DIAGNOSING PATHOLOGICAL PHENOMENON USING A VOICE SIGNAL

RELATED APPLICATIONS

This application claims the benefit of U.S. Provisional Application Ser. No. 60/681,473, filed May 17, 2005, which is incorporated herein by reference in its entirety.

FIELD OF THE INVENTION

The present invention relates to a method and system for diagnosing pathological phenomenon using a voice signal.

In one embodiment, the existence of at least one pathological phenomena is determined based at least in part upon a calculated average intensity function (described below) associated with speech from the patient.

In another embodiment, the existence of at least one pathological phenomena is determined based at least in part upon a calculated maximum intensity function (described below) associated with speech from the patient.

For the purposes of describing and claiming the present invention, the term "crater feature" is intended to refer to a shape (on a graph of frequency vs. intensity) which manifests as a sharp drop at a first frequency continued by a relatively low level along approximately 50 Hz or more and then a relatively steep rise at a second frequency. FIG. 1A illustrates an example crater feature (this example is idealized, and other crater features may have curved contours). Of note, such crater features can be mathematically defined as points of derivatives discontinuities (a significant leap of the function derivative).

Further, for the purposes of describing and claiming the present invention, the term "table feature" (hereinafter sometimes referred to as "high altitude plateaus", "tablelands" or "peaks") is intended to refer to a shape (on a graph of frequency vs. intensity) which manifests as a sharp rise in intensity at a first frequency followed by a sharp drop in intensity at a second frequency. In between these two aforementioned frequencies, there is no significant change in intensity (the bandwidth of such a table feature may be at least, for example, around 10 Hz). This behavior is accompanied by a leap of the function derivative. FIG. 1B illustrates an example table feature (this example is idealized, and other table features may have curved contours).

BACKGROUND OF THE INVENTION

Computer hardware and software for various types of voice analysis is known.

Nevertheless, the analysis of a human voice signal for the purposes of diagnosing a pathological phenomenon according to the techniques taught by the present invention has not been known.

BRIEF DESCRIPTION OF THE DRAWINGS

FIG. 1A illustrates an example crater feature according to an embodiment of the present invention.

FIG. 1B illustrates an example table feature according to an embodiment of the present invention.

FIGS. 3A and 3B illustrate example graphs of intensity of a voice signal as a function of frequency, wherein the voice signal is generated by a person having mild Alzheimer's disease (FIG. 3A illustrates a graph of the average intensity function and FIG. 3B illustrates a graph of the maximum intensity function). Of note, in FIG. 3A the average intensity's rapid decay is illustrated, while in FIG. 3B the decay of the maximum intensity function of the same person is illustrated.

Figure 2A:
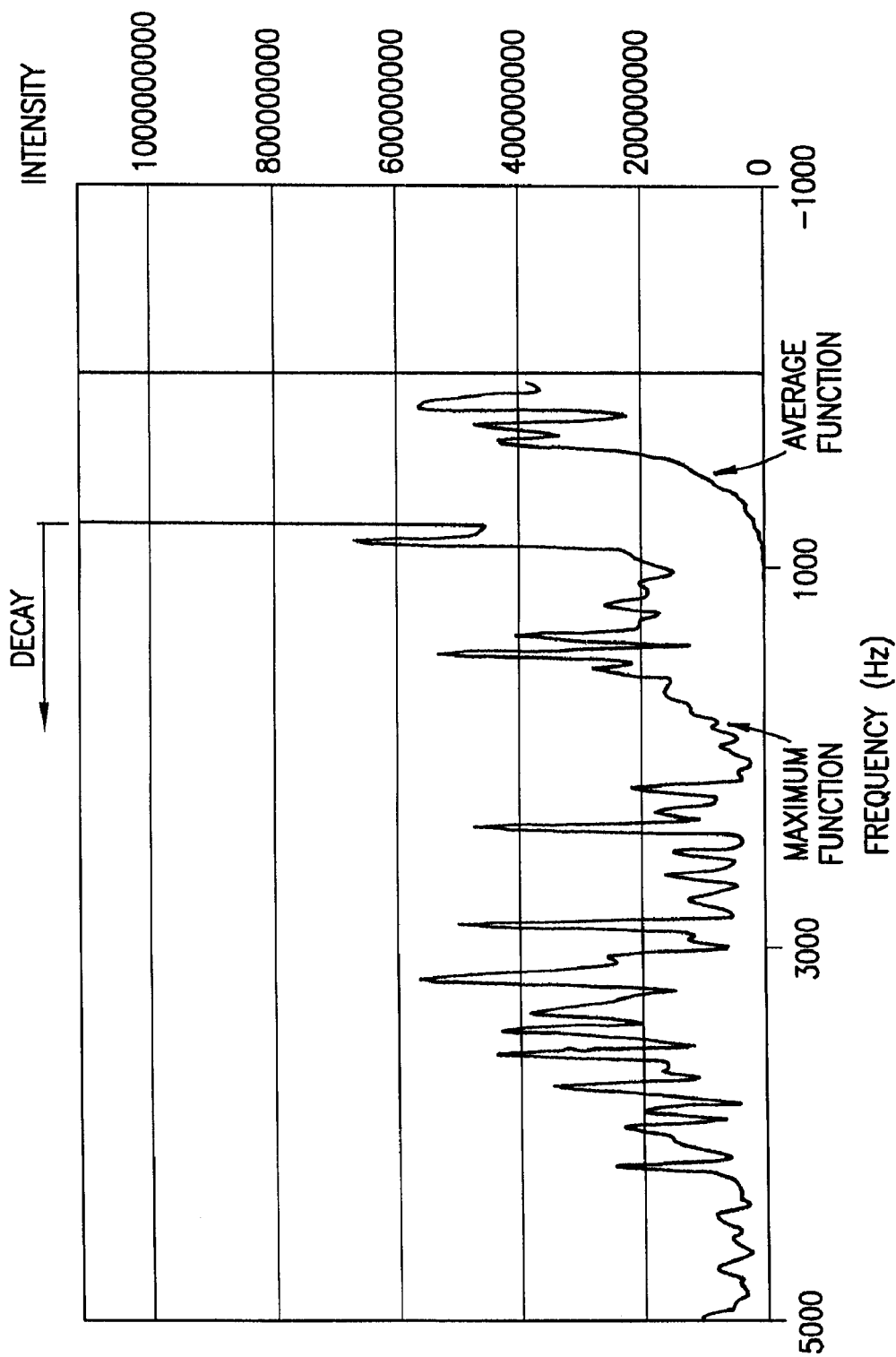
FIG. 2A illustrates an example graph of average and maximum intensity functions according to an embodiment of the present invention (in this example, it is seen that in people with Parkinson's disease the maximum intensity starts to decay at approximately 1500-2500 Hz.

Among those benefits and improvements that have been disclosed, other objects and advantages of this invention will become apparent from the following description taken in conjunction with the accompanying figures. The figures constitute a part of this specification and include illustrative embodiments of the present invention and illustrate various objects and features thereof.

DETAILED DESCRIPTION OF THE INVENTION

Detailed embodiments of the present invention are disclosed herein; however, it is to be understood that the disclosed embodiments are merely illustrative of the invention that may be embodied in various forms. In addition, each of the examples given in connection with the various embodiments of the invention are intended to be illustrative, and not restrictive. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

Referring now to one embodiment of the present invention, it is noted that certain measured indicators (that are indicative of medical and/or psychological maladies) are identified within specific frequency ranges within a graphic display of an average and/or maximum intensity function. The graphic displays of this embodiment (which may be output, for example, on a computer screen and/or as hard copy printouts) are as follows:

A. The presence of one or more crater features (as described above) within specific frequencies.
B. The presence of one or more table features (as described above) within specific frequencies.
C. A change in the frequency location of crater feature(s) and/or table feature(s) amongst measurements taken at different times.
D. A sharp graphic decline—the derivative of the intensity function is either a very high positive number or a very high negative number relative to the normal population.

Referring now to another embodiment of the present invention, a method for diagnosing at least one pathological phenomenon using a voice signal and a pre-determined indicators set representative of the at least one physiological phenomena is provided. In one example, the indicators set may be indicative of the occurrence of one or more characteristic features in a voice signal of a human having the physiological phenomenon (the characteristic features may include one or more crater features, table features and/or decay features).

The method according to this embodiment may comprise: receiving data indicative of a voice signal; computing an average intensity of voice as a function of frequency using the data; computing a maximum intensity of voice as a function of frequency using the data; identifying one or more features indicated by the average and/or maximum intensities (wherein the identified features include one or more crater features, table features and/or decay features); comparing the identified features with the features in the indicators set to yield comparison results; and diagnosing at least one pathological phenomenon based on the comparison results.

In another embodiment of the present invention a system for diagnosing at least one pathological phenomenon using a voice signal and a pre-determined indicators set representative of the at least one physiological phenomena is provided. In one example, the indicators set may be indicative of the occurrence of one or more characteristic features in a voice signal of a human having the physiological phenomenon (the characteristic features may one or more crater features, table features, and/or decay features).

The system according to this embodiment may comprise: an input device for receiving data indicative of a voice signal; a function processor for computing an average intensity of voice as a function of frequency using the data; a function processor for computing a maximum intensity of voice as a function of frequency using the data; a features identifying unit for identifying features indicated by the average and/or maximum intensities (wherein the identified features include one or more crater features, table features and/or decay features); a comparator for comparing the identified features with the features in the indicators set to yield comparison results; and a diagnosis unit for diagnosing at least one pathological phenomenon based on the comparison results.

Reference will now be made more particularly to the average intensity of voice as a function of frequency (i.e., the function of the subject's average voice intensity, based on the voice frequency variable) and the maximum intensity of voice as a function of frequency (i.e., the envelope function (the maximum) of the subject's voice intensity, based on the voice frequency variable).

In this regard, it is noted that the behavior of these aforementioned functions (i.e., the "average intensity function" and the "maximum intensity function") and their derivatives is related to different pathologic phenomena. In other words, the function of the average and/or maximum voice intensity should be tested, and not necessarily the voice intensity over time. The former enables identification of pathologic phenomena, which are not coincidental and do not originate from a temporary situation.

Figure 2B:
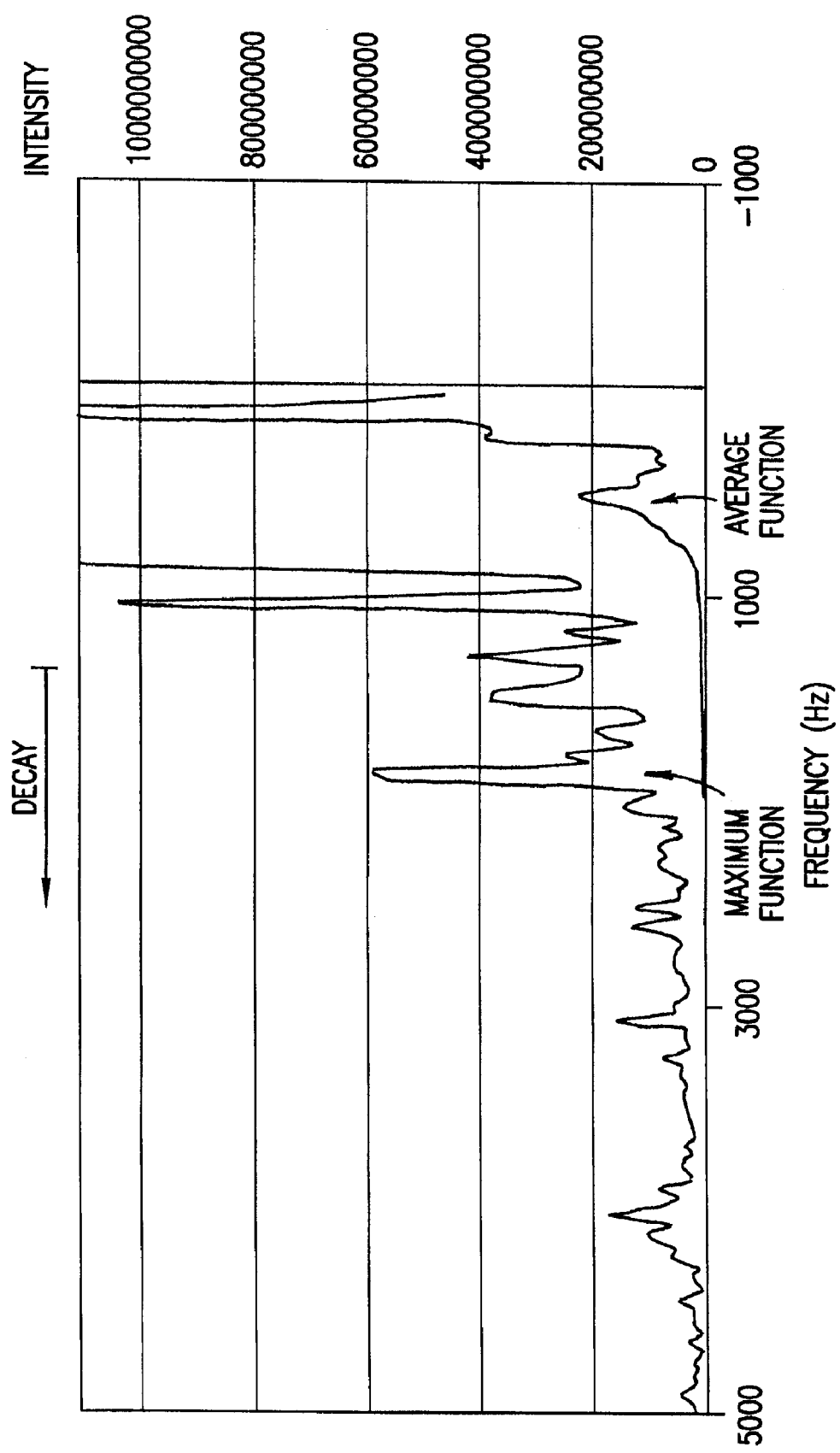
FIG. 2B illustrates an example graph of average and maximum intensity functions according to an embodiment of the present invention (in this example, it is seen that with the development of the disease, the effective decaying point gradually changes, subsiding from between approximately 12,000-7,000 to the area of approximately 2,500 Hz and below.
Figure 2C:
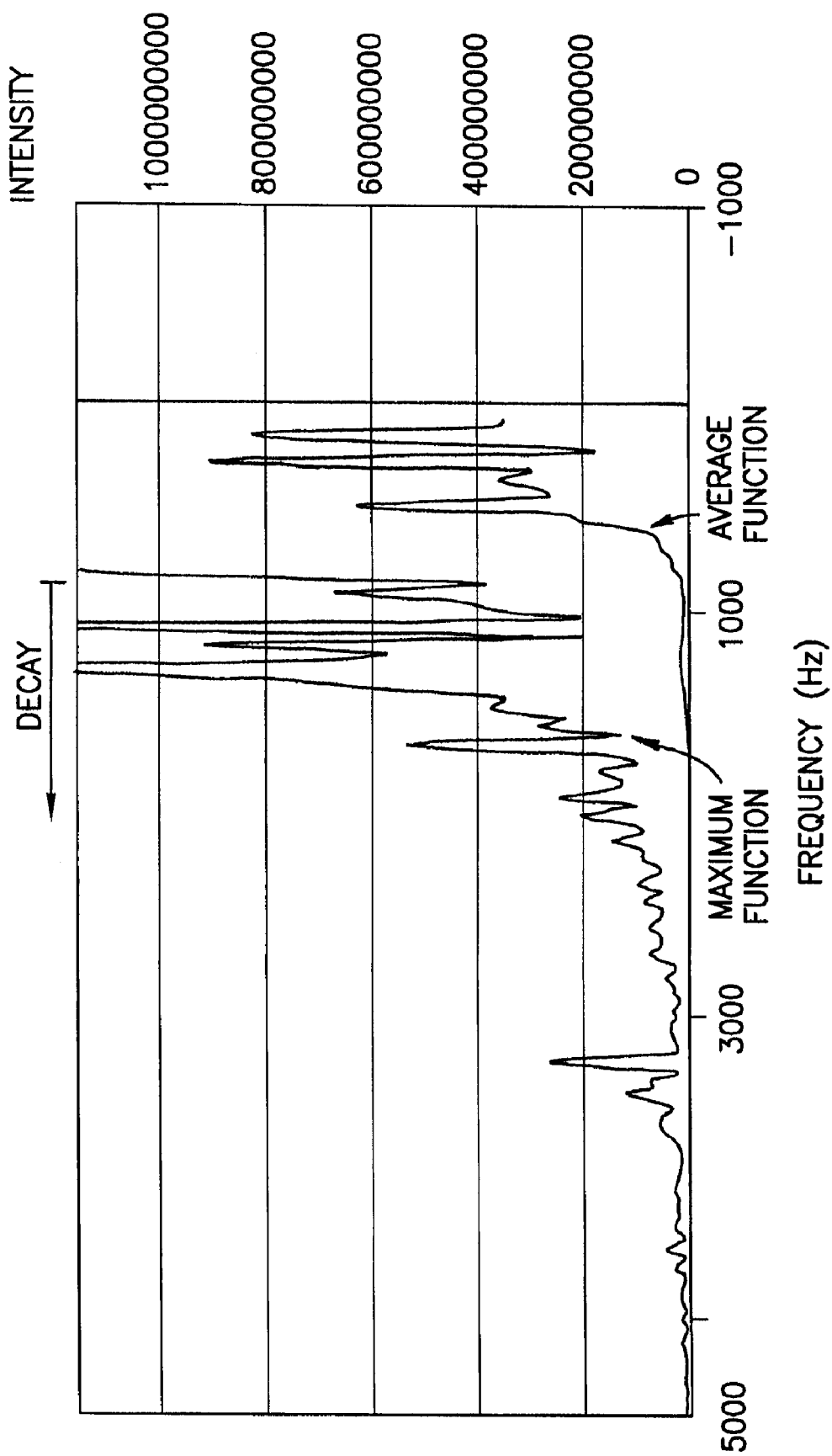
FIG. 2C illustrates an example graph of average and maximum intensity functions according to an embodiment of the present invention (in this example, it is seen in severe cases that the decay even drops to approximately 900 Hz.
Figure 3A:
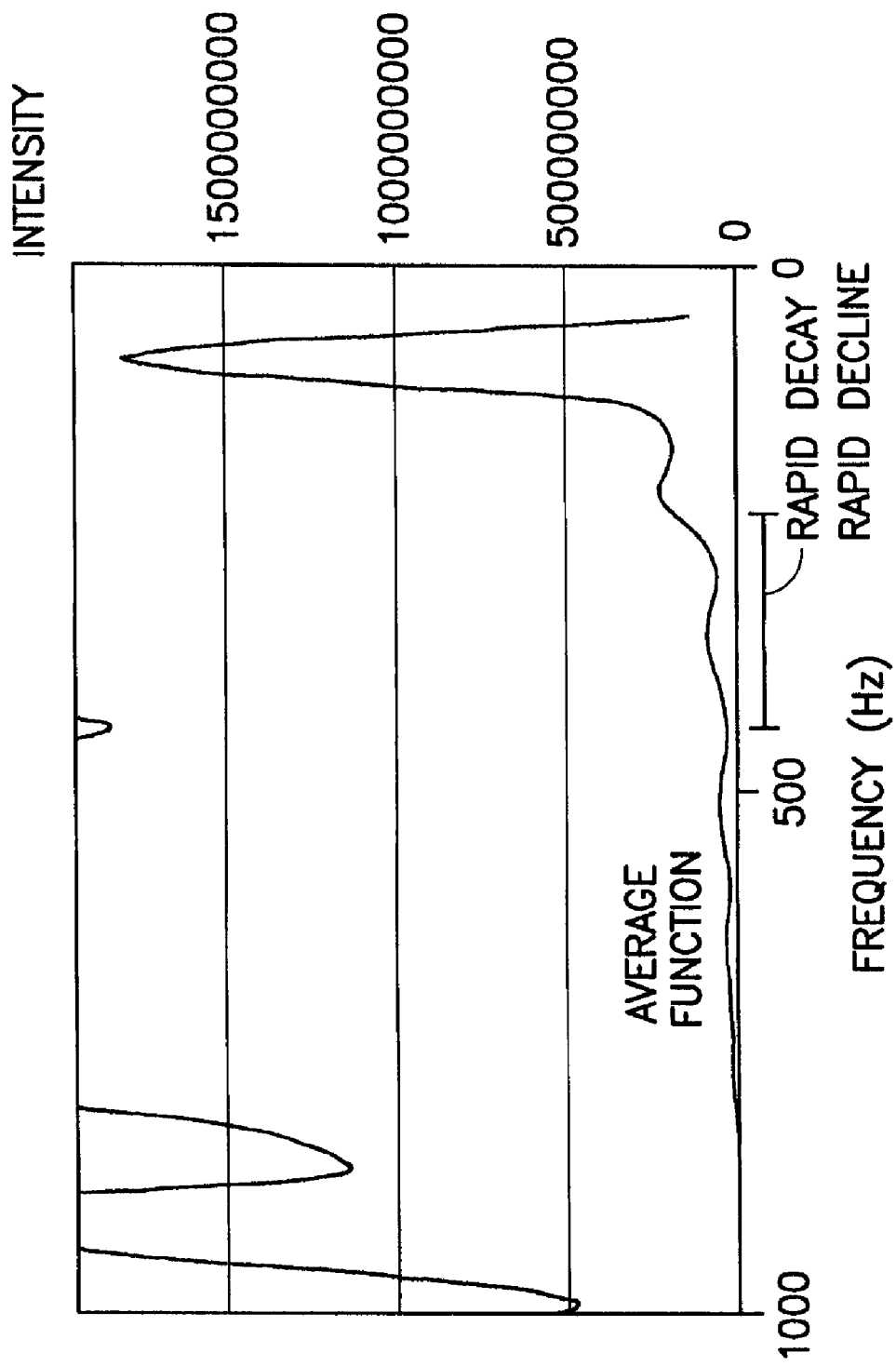
Figure 4A:
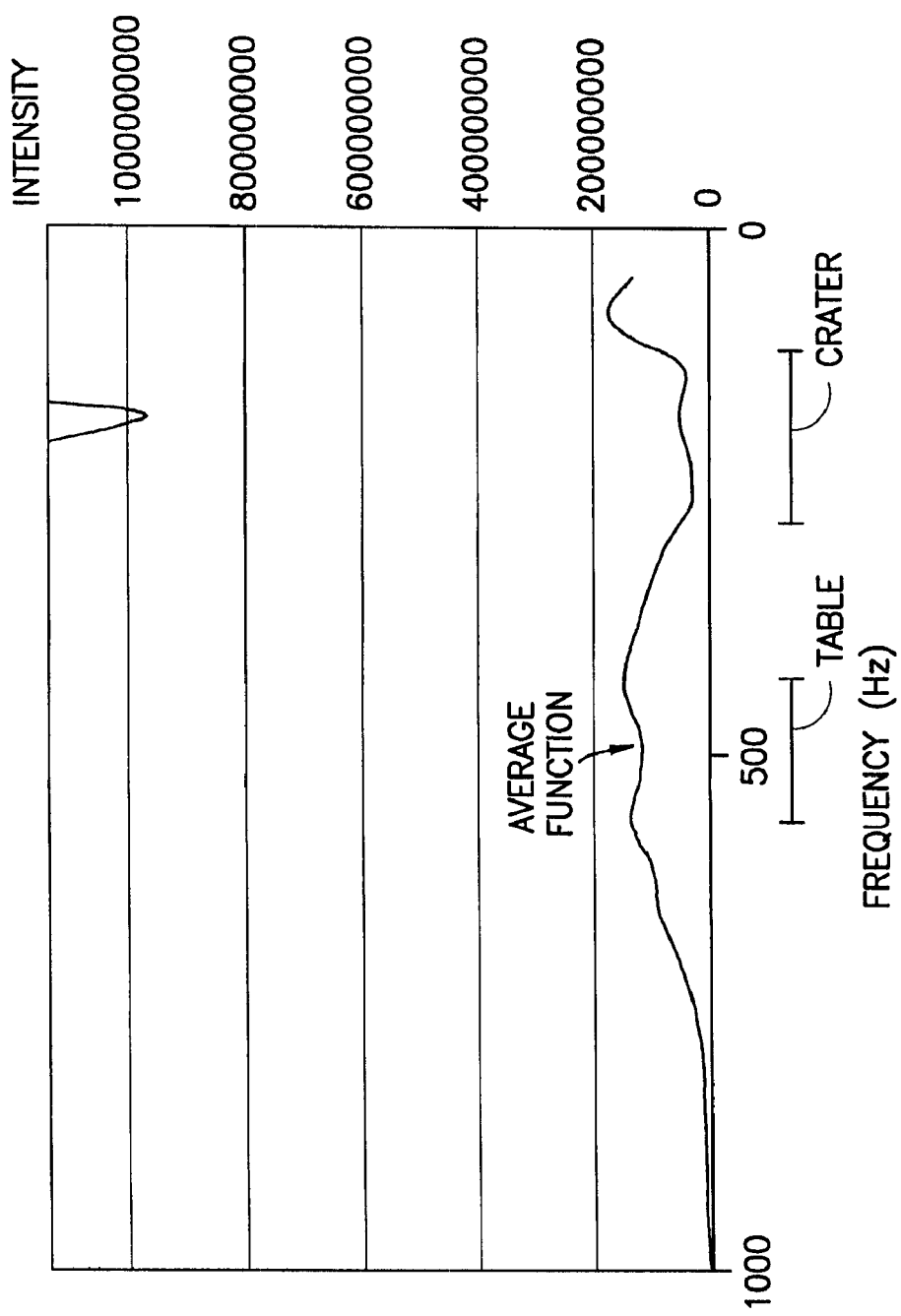
FIGS. 4A and 4B illustrate example graphs of intensity of a voice signal as a function of frequency, wherein the voice signal is generated by a person having middle-stage (FIG. 4A) and severe (FIG. 4B) dyslexia (the functions illustrated in FIGS. 4A and 4B are the average intensity functions—also, example crater and table features are identified in the graphs).
Figure 4B:
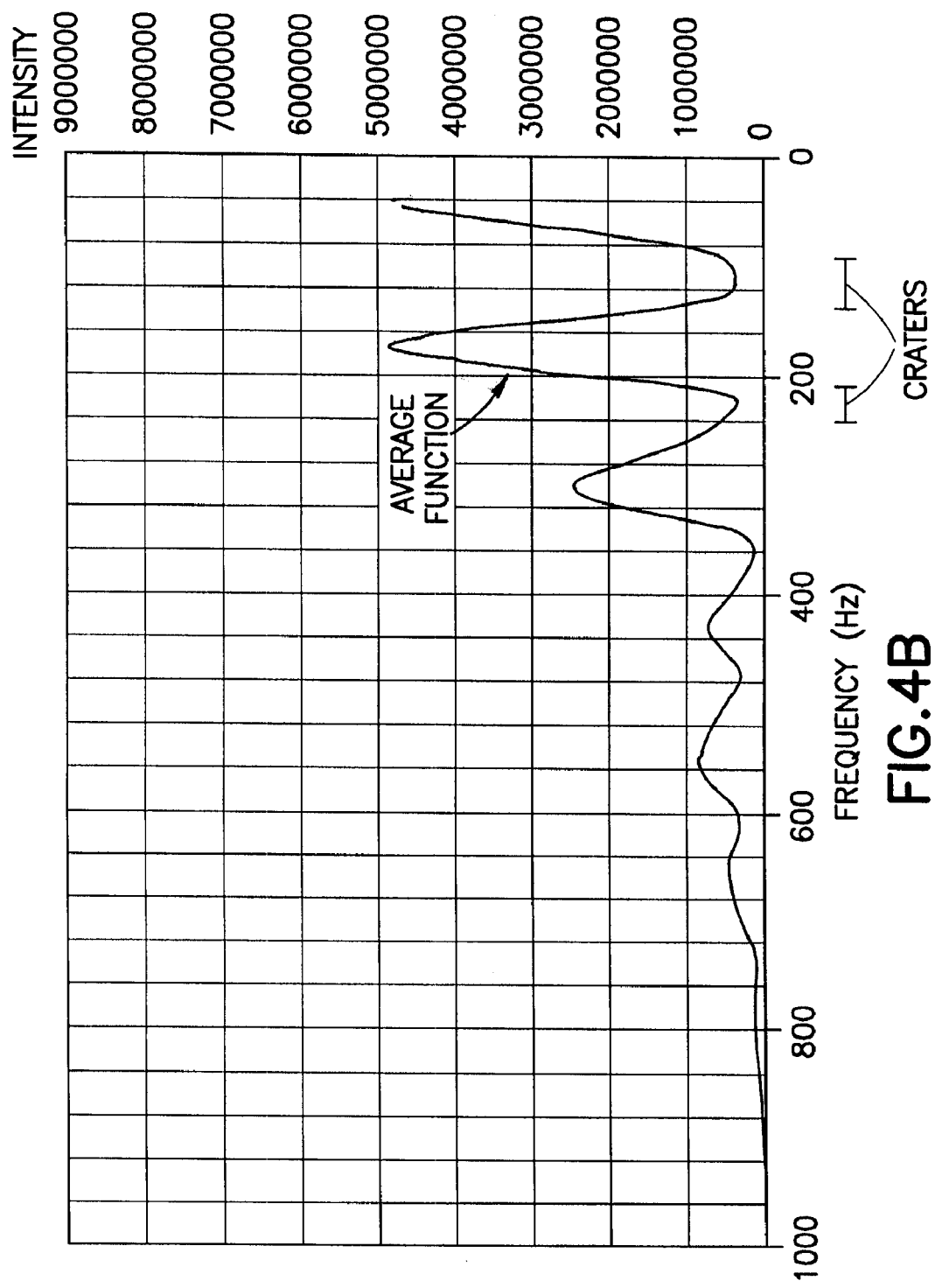
Figure 5:
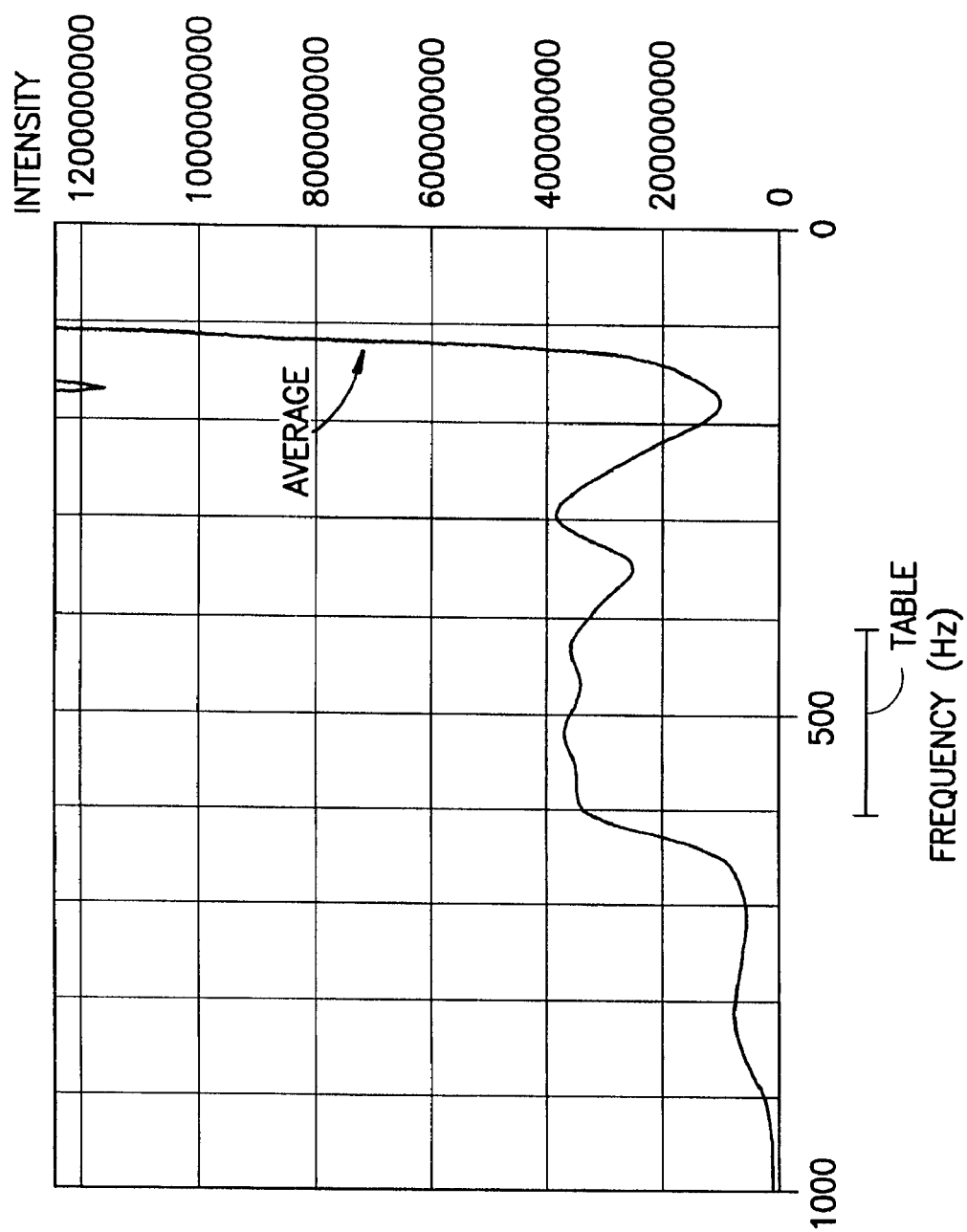
FIG. 5 illustrates an example graph of intensity of a voice signal as function of frequency, wherein the voice signal is generated by a person having middle-stage diabetes (the function illustrated in FIG. 5 is the average intensity function—also, an example table feature is identified in the graph).

For example, a certain crater feature found in the average intensity function is indicative of dyslexia. In another example, a certain table feature found in the average intensity function is indicative of ADD (without hyperactivity). In yet another example, in people with Parkinson's disease the maximum intensity starts to decay at approximately 1500-2500 Hz (see FIG. 2A). With the development of the disease, the effective decaying point gradually changes, subsiding from between approximately 12,000-7,000 to the area of approximately 2,500 Hz and below (see FIG. 2B). In severe cases it even drops to approximately 900 Hz (see FIG. 2C). In contrast, in the healthy individual, the maximum intensity function does not usually decay to zero before it reaches the range of 7000-12000 Hz.

Referring now again to the average intensity function, it is noted that in one example the average intensity function may be computed by measuring the intensity of the speaker's voice during the time period "T" (in one example, T may be a relatively short span of a few dozen seconds). The average voice intensity is measured by measuring the intensities of sound at each different frequency, in the frequency range of between, for example, 20 Hz and 15000 Hz, during multiple time-points within the range T. The time-points (T1) may be selected to be equally distributed during the total range T. At each time-point, the intensity of each frequency is measured and is described as a function "F1" of that frequency I(F1,T1). This measurement is repeated at every time-point for a total of "N" measurements to span the entire range T. Thus, in this example, the average intensity function for each frequency can be described as:

$$I(f0) = 1/n \sum_{i=1}^{n} I(f0, T_1)$$

Referring now again to the maximum intensity function, it is noted that in one example essentially the same voice intensity measurements that were described for the average intensity function may be collected. In this example, the maximum intensity function will be arrived at (during the time T) by the equation:

$$I\text{MAX}(f0) = \text{MAX}[I(f0,T)]$$

Figure 6A:
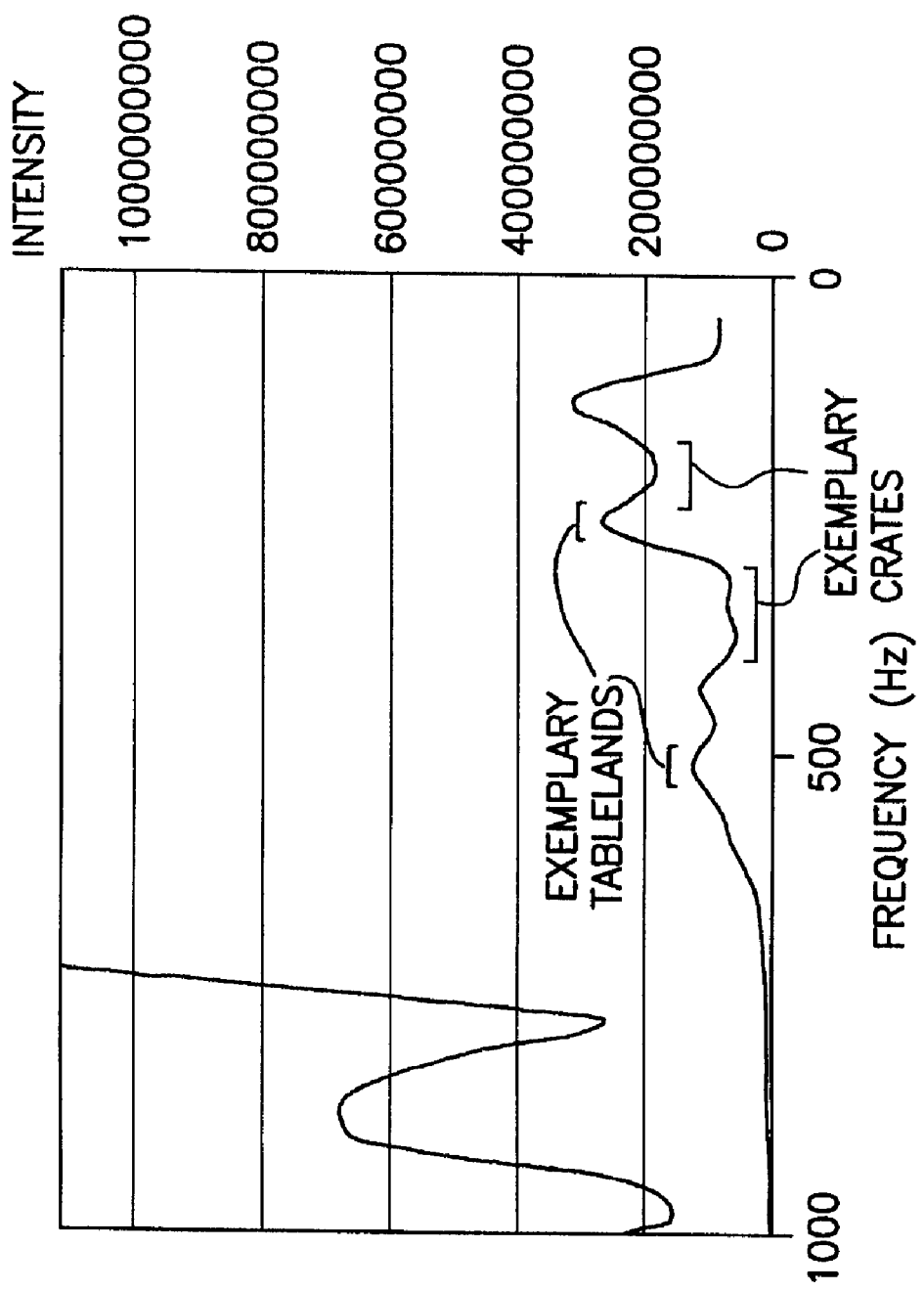
FIG. 6A illustrates several example table features and crater features.
Figure 6B:
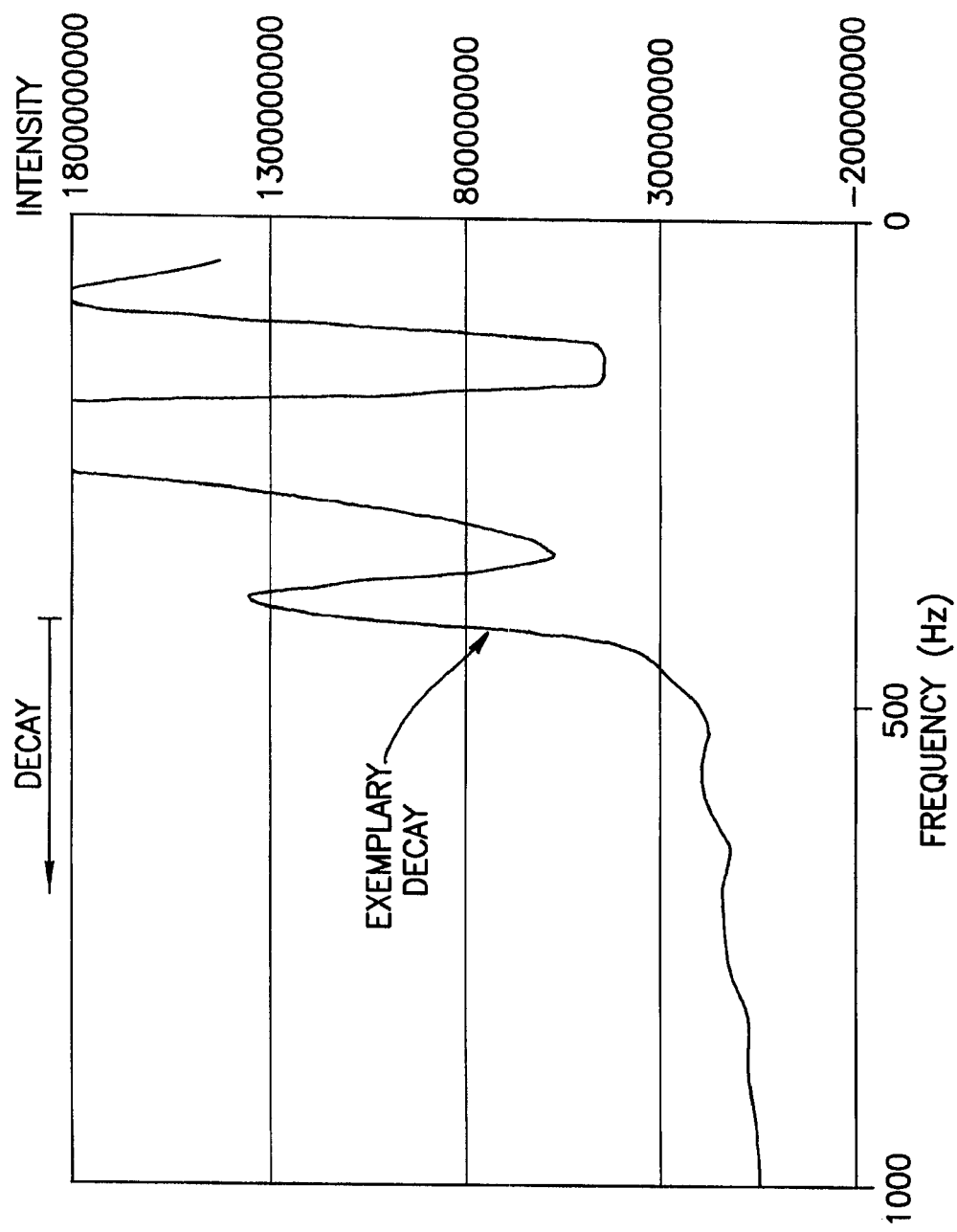
FIG. 6B illustrates an example decay.

In order to more particularly illustrate use of these functions, reference will now be made to FIGS. 6A and 6B. As seen in these Figs., FIG. 6A illustrates several example table features and several example crater features, while FIG. 6B illustrates an example decay. In any case, in one example, the functions may be used as follows:

1. Identification of the local minimum and maximum points on the average intensity graph, as a function of the frequency (points may be marked as f0 min and f0 max).
2. Calculation of the I(f) function derivatives (average intensity as a function of frequency) in the area of minimum and maximum points.
3. Location of the discontinuity points in the (f) derivative within the local minimum and maximum areas (may be marked e.g. as points f1, f2)
4. Calculation of the level of the average crater feature or table feature at the minimum, e.g., ½[1(f1)+I(f2)−I(f0)

5. Calculation of the level of the average crater feature or table feature at the maximum, e.g., $I(f0\ max) - \frac{1}{2}[i(f1)+I(f2)]$ 6. Calculation of the width of the crater feature (or table feature), e.g., $(f1-f2)$ 7. In one example, if the height of the crater is larger than approximately 5% of the maximal height of I(f) and if the crater width is greater than approximately 50 Hz, this signifies a significant crater. Further, according to one example, the extent of the height and width differences is an additional indicator of the intensity of the phenomena (the same may apply to a table feature). Thus, it is possible to have several pre-determined ranges, used for identifying the intensity, or severity of the phenomena.

8. The frequencies around which the crater feature(s) and/or table feature(s) occurs may indicate the type of phenomena.

Reference will now be made to the following examples of pathologies which may be identified using various embodiments of the present invention (of course, these examples are intended to be illustrative and not restrictive):

A. The following specific pathologies: Attention-deficit Disorder (ADD), Attention-deficit Hyperactivity Disorder (ADHD), Dyslexia, Parkinson's Disease, Heart Disease, Alzheimer's Disease, Juvenile Diabetes and Autism).

B. Disease states that include the symptom of either complete "loss of hearing" or "loss of hearing" of certain frequencies (examples of such disease states include Dyslexia and certain types of ADD).

C. Medical or psychological conditions that include the symptom of having difficulties concentrating, focusing or paying full attention (for example, ADD, ADHD, Autism).

D. Medical conditions that are associated with (or even caused by) a neurotransmitter or hormonal level imbalance (e.g., levels that are either too high or too low.) For example, conditions that are caused by an imbalance in one of the following: Dopamine, Norepinephrine, Serotonine, Testosterone or Acetylcholine. In this regard, it is noted, for example, that:
  1. A dopamine deficiency is associated with Parkinson's disease, Alzheimer's disease, mental depression and clinical lethargy.
  2. A serotonine deficiency is associated with panic disorder (associated also with excess serotonine) and with ADHD.
  3. Excessive norepinephrine or testosterone are associated with aggressive behavior.
  4. Excessive testosterone is associated with juvenile diabetes (especially in women).

E. Medical conditions associated with defective regulation of physiological systems (e.g., cardiovascular, pulmonary, digestive or chemical exchange).

F. Problems associated with lethargy, "lack of energy" or motor control.

G. Problems with lower back or reproductive organs.

H. Immune system conditions (e.g. AIDS, cancer).

Reference will now be made to the following examples (which examples are intended to be illustrative and not restrictive) of voice analysis indications for certain pathologies according to various embodiments of the present invention (of note, when a number of features are described for a given indication, the occurrence of more than one of the features may be indicative of a more severe condition and/or a higher confidence in the diagnosis):

1. Dyslexia—Typical voice pattern indications:
   A. There are a number of craters in the graph of the average intensity function. The craters are at 100-140 Hz, 220-260 Hz, 320-380 Hz and 460-520 Hz. There is a correlation between the number of craters and the severity of dyslexia.
   B. A rapid decline in the graph of the average intensity function starting at 400-600 Hz. Here too, there is a correlation between the severity of dyslexia and the slope of the decline.

2. ADD (without hyperactivity)—Typical voice pattern indications:
   A. One high peak (table feature), in the graph of the average intensity function, in the region of $260\pm20$ Hz.

3. ADHD—Typical voice pattern indications:
   A. In the graph of the average intensity function there are relatively frequent (as compared to the general population) oscillations between crater features and table features—and there is an increase in the total number of these features—within the range between 20 and 1500 Hz. There is a similar effect in the maximum intensity function within the same frequency range.

4. Autism—Typical voice pattern indications:
   A. Table features around the two frequencies of $300\pm20$ Hz and $620\pm40$ Hz (in the average intensity function).
   B. And/or table features around the two frequencies of $400\pm20$ Hz and $800\pm40$ Hz (in the average intensity function).
   C. And/or a local maximum around $480\pm30$ Hz (in the average intensity function).

5. Parkinson's—Typical voice pattern indications:
   A. Very few table features in the graph of the average intensity function (one to three) and two of them are in the regions of either 35-45 Hz, 115-140 Hz or 250-280 Hz.
   B. A crater feature in the range of 300-400 Hz (in the average intensity function).
   C. The graph of the maximum intensity function show a sharp decline within the range of 800 to 2500 Hz.
   D. The graph of the average intensity function show a sharp decline between 350 Hz and 550 Hz.

6. Alzheimer's—Typical voice pattern indications:
   A. Similar sharp declines as were described for Parkinson's but more pronounced. For example, the graph of the average intensity function shows a decline starting at 300 Hz.

7. Cardio-pulmonary Conditions—Typical voice pattern indications:
   A. A crater feature within the range of 260-380 Hz (in the average intensity function).
   B. In more severe cases, the crater feature (in the average intensity function) may stretch over a longer range (e.g., within the range of 180-500 Hz).
   C. In the graph of the average intensity function: an intensity peak (high altitude peak) in the region of 40-45 Hz. In the graph of the maximum intensity function, this peak is found in the region of $125\pm15$ Hz (for men) or $220\pm20$ Hz (for women).

8. Juvenile Diabetes—Typical voice pattern indications:
   A. The graph of the average intensity at $40\pm5$ Hz is four times the average intensity observed for 125 Hz and 220 Hz.
   B. For women: the average intensity at 125 Hz is higher than the average intensity observed at 220 Hz (this is the opposite of what is observed in general population women).

9. Weakness in Sensory Perception—Typical voice pattern indications:
   A. A sharp decline is observed in the graph of the average intensity within the region of 400 Hz and 600 Hz.
   B. A wide crater feature, of at least 40 Hz, or two crater features within the region of 360-500 Hz (in the average intensity function).
   C. A crater feature in the region of 800±50 Hz (in the average intensity function).
10. Listening Problems—Typical voice pattern indications:
    A. In the graph of the average intensity function, one or two table features around 120±20 Hz and 260±30 Hz whereby the intensity of the table feature(s) is at a ratio of at least 3:2 with respect to other table features (if there are any). This is indicative of listening being limited to a number of subjects.
    B. A high number of "high altitude peaks" (table features) in the average intensity function (at least four such peaks, within the range of 40 and 1200 Hz, is indicative of an attention disorder combined with hyperactivity.)
    C. In the graph of the maximum intensity function, the existence of more than 15 "high altitude peaks" (table features) within the range of 200 and 2000 Hz (indicative of attention disorder with hyperactivity).
11. Dopamine Deficiency—Typical voice pattern indications:
    A. In the graph of the average intensity function, "high altitude peaks" (table features) in the region of 125±20 Hz or 260±30 Hz. The peak intensities are at least twice as high as other peaks.
    B. One or two table features, with each one having a width of 30-50 Hz, within the range of 120 to 900 Hz (in the average intensity function).
    C. A rapid decline in the graph of the average intensity function in the region of 400 to 500 Hz.
    D. A rapid decline of the graph of the maximum intensity function at least by 2500 Hz.
12. Serotonin Deficiency—Typical voice pattern indications:
    A. Patterns similar to those described for ADHD (paragraph 3(A) above).
13. Depression—Typical voice pattern indications:
    A. A combination of patterns as described for serotonin and dopamine deficiencies.
14. Excess of Norepinephrine and/or Testosterone—Typical voice pattern indications:
    A. The graph of the average intensity function shows relatively high table features within the region 1000-1500 Hz (equal to or higher than peaks found within the range of 500-1000 Hz).
    B. In the graph of the average intensity function, a high intensity peak in the region of 35-45 Hz, that is up to three times as high as the average intensity at 120 Hz (for men) or 215 Hz (for women).
15. Excess of Serotonin and/or Acetylcholine—Typical voice pattern indications:
    A. Patterns similar to those described above in paragraph 10(A) above.
16. Problems associated with Regulation—Typical voice pattern indications:
    A. Significant changes in intensity, as a function of time, within the regions 40-45 Hz, 320-380 Hz and 640-780 Hz (in the average intensity function).
    B. Relatively high intensity in the range of 40-45 Hz combined with a crater feature within the range 320-380 Hz (in the average intensity function).
    C. A "shifting" of whole graphs, by a low multiple of 10 Hz, between repeated measurements (in the average intensity function).
17. Motor control and/or Lethargy—Typical voice pattern indications:
    A. An early, rapid decline in the graph of the average intensity function (in the region of 350 Hz.).
    B. An early, rapid decline in the graph of the maximum intensity function (in the region of 2000 Hz.)
18. Pathologies of Lower back and/or Reproductive Organs—Typical voice pattern indications:
    A. In the graph of the average intensity function, a crater feature in the region of 300±30 Hz and/or a crater feature in the region of 600±40 Hz.
    B. In the graph of the maximum intensity function, a crater feature at 1200±50 Hz.
19. Immune System Problems (e.g. cancer, AIDS)—Typical voice pattern indications:
    A. In the graph of the average intensity function, crater features in at least two out of the following three regions: 120±20 Hz, 260±30 Hz and 520±40 Hz.
    B. In the graph of the maximum intensity function, a crater feature at 1040±30 Hz.
    C. A rapid decline in the graph of the maximum intensity function at 2000 Hz or lower.

Reference will now be made to an embodiment of the present invention related to comparative measurements. In this regard, it is noted that when analyzing voice patterns over time, a comparative analysis may be carried out. In one example (which example is intended to be illustrative and not restrictive), the analysis may look at the following aspects:
   A. The appearance of new crater features, especially in the graph of the average intensity function.
   B. Deepening of previously observed crater feature(s) in the graph of the average intensity function (e.g., the distance between the lower level of the crater feature and the surrounding peaks grew significantly by multiples of 10%).
   C. Widening of crater feature(s) in the graph of the average intensity function, relative to previous measurements (again, for example, by at least a few multiples of 10%).
   D. A shifting, to either direction, of a crater feature or a table feature, in the graph of the average intensity function, by at least 40 Hz.
   E. A rapid and early decline in the graph of either the average or the maximum intensity function.
   F. The appearance of a table feature pattern (in the average intensity function), not seen before, especially in one of the following regions: 40±5 Hz, 120±20 Hz or 260±30 Hz.

Figure 7:
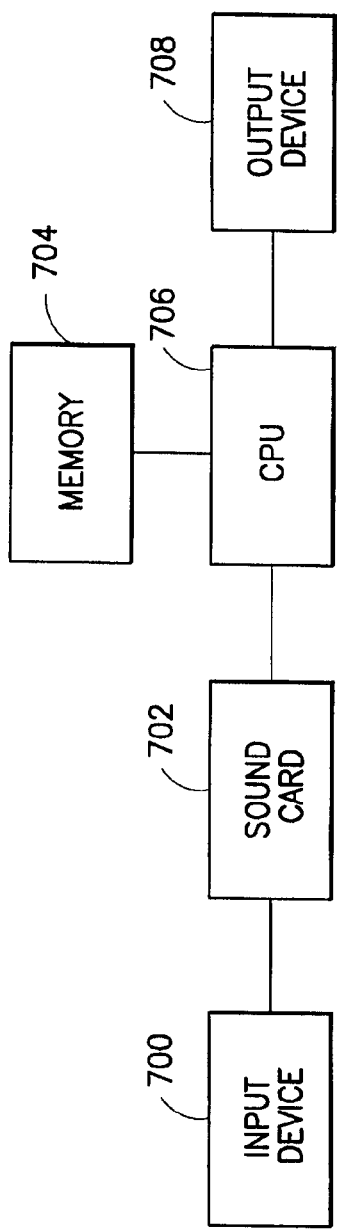
FIG. 7 is a block diagram of an example system according to an embodiment of the present invention.
Figure 8:
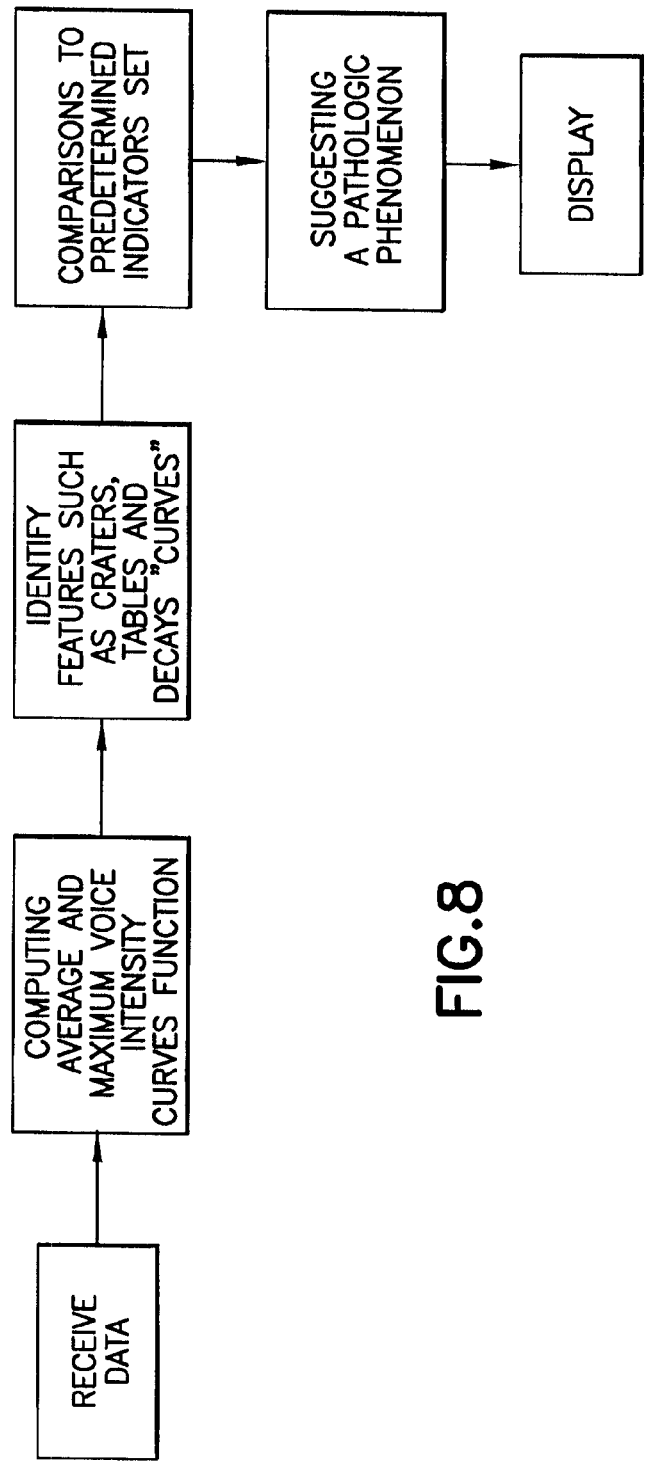
FIG. 8 is a block diagram of an example diagnostic flowchart according to an embodiment of the present invention.

Reference will now be made to an example system according to an embodiment of the present invention. More particularly, as seen in FIG. 7, in this example the system may include: a voice signal input device 700, such as a microphone (MIC); (2) a sound card 702; (3) a memory device 704 (it is noted that as used herein the term memory device is intended to be illustrative, and not restrictive, and that any desired storage device such as disks, RAIDS, RAM, ROM, flash memory cards and/or others may be used); (4) a function processor (shown in this Fig. as being included with CPU 706) for computing average and maximum intensities of voice as functions of frequency using the data received from the input device; (5) a features identifying unit (shown in this Fig. as being included with CPU 706) for identifying features indicated by the average and maximum intensities, wherein the indicated features include at least one crater feature, table feature and/or decay; (6) a storage device (shown in this Fig. as being included with CPU 706) for storing a parameter set of non-normative situations/indicators of specific pathologies (e.g., a pre-determined indicators set representative of at least one physiological phenomenon, wherein the indicators set may be indicative of the occurrence of one or more characteristic features in a voice signal of a human having the physiological phenomenon); (7) a comparator (shown in this Fig. as being included with CPU 706) that compares the features identified by the features identifying unit with the features indicated by the indicators set; (8) a diagnosis unit (shown in this Fig. as being included with CPU 706) for receiving the comparison results and using the comparison results for diagnosing pathological phenomenon; and (9) an output device 708, such as a display (e.g., a monitor and/or a hardcopy report).

While a number of embodiments of the present invention have been described, it is understood that these embodiments are illustrative only, and not restrictive, and that many modifications may become apparent to those of ordinary skill in the art. For example, an analog voice signal (e.g., based on speech from a patient) may be input to a microphone, wherein a sound card may then be used to capture the voice signal as digital data (in this regard, MPEG is one specific example of a format for storing digital data indicative of voice signals). Further, according to some embodiments of the present invention the function processor and/or the features identifying unit; and/or the comparator; and/or the diagnosis unit and/or the storage device can be software units associated with and/or executed by a CPU (Central Processing Unit) operating a computer (of course, in other embodiments, one or more of the aforementioned elements may comprise hardware (e.g., dedicated hardware). Further still, any steps described herein may be carried out in any desired order (and any desired steps may be added and/or deleted).

What is claimed is:

1. A method for diagnosing a patient, comprising:
   receiving data indicative of speech from the patient;
   calculating, based upon the received data, an average intensity function across a plurality of frequencies; and
   determining, based at least in part upon a change in intensity between at least two frequencies found in the calculated average intensity function, an existence of at least one pathological phenomena associated with the patient;
   wherein the average intensity function is calculated across the plurality of frequencies by averaging, at each of the plurality of frequencies, a plurality of sample intensity values of the speech.

2. The method of claim 1, wherein for each of the plurality of frequencies each of the respective plurality of sample intensity values is separated by a time period.

3. The method of claim 2, wherein each time period is essentially the same.

4. The method of claim 2, wherein the speech has a finite duration and each time period separating the respective plurality of sample intensity values is essentially evenly distributed within the duration of the speech.

5. The method of claim 1, wherein the existence of at least one pathological phenomena associated with the patient is determined based at least in part upon the average intensity function including at least one crater feature.

6. The method of claim 5, wherein at least one of a height and a width of the crater feature provides an indicator of an intensity of the pathological phenomena.

7. The method of claim 1, wherein the existence of at least one pathological phenomena associated with the patient is determined based at least in part upon the average intensity function including at least one table feature.

8. The method of claim 1, wherein the existence of at least one pathological phenomena associated with the patient is determined based at least in part upon the average intensity function including a relatively rapid decline in intensity at the high end of the frequency range of the average intensity function.

9. The method of claim 1, wherein the steps are carried out in the order recited.

10. A method for diagnosing a patient, comprising:
    receiving data indicative of speech from the patient;
    calculating, based upon the received data, a maximum intensity function across a plurality of frequencies; and
    determining, based at least in part upon a change in intensity between at least two frequencies found in the calculated maximum intensity function, an existence of at least one pathological phenomena associated with the patient;
    wherein the maximum intensity function is calculated across the plurality of frequencies by determining, at each of the plurality of frequencies, a maximum of a plurality of sample intensity values of the speech.

11. The method of claim 10, wherein for each of the plurality of frequencies each of the respective plurality of sample intensity values is separated by a time period.

12. The method of claim 11, wherein each time period is essentially the same.

13. The method of claim 11, wherein the speech has a finite duration and each time period separating the respective plurality of sample intensity values is essentially evenly distributed within the duration of the speech.

14. The method of claim 10, wherein the existence of at least one pathological phenomena associated with the patient is determined based at least in part upon the maximum intensity function including at least one crater feature.

15. The method of claim 14, wherein at least one of a height and a width of the crater feature provides an indicator of an intensity of the pathological phenomena.

16. The method of claim 10, wherein the existence of at least one pathological phenomena associated with the patient is determined based at least in part upon the maximum intensity function including at least one table feature.

17. The method of claim 10, wherein the existence of at least one pathological phenomena associated with the patient is determined based at least in part upon the maximum intensity function including a relatively rapid decline in intensity at the high end of the frequency range of the maximum intensity function.

18. The method of claim 10, wherein the steps are carried out in the order recited.

19. A system for diagnosing a patient, comprising:
    an input mechanism, wherein the input mechanism receives data indicative of speech from the patient;
    a calculating mechanism, wherein the calculating mechanism calculates, based upon the received data, an average intensity function across a plurality of frequencies; and
    a determining mechanism, wherein the determining mechanism determines, based at least in part upon a change in intensity between at least two frequencies found in the calculated average intensity function, an existence of at least one pathological phenomena associated with the patient;

wherein the average intensity function is calculated across the plurality of frequencies by averaging, at each of the plurality of frequencies, a plurality of sample intensity values of the speech.

20. The system of claim 19, wherein each of the input mechanism, the calculating mechanism and the determining mechanism comprises at least one of computer software and computer hardware.

21. A system for diagnosing a patient, comprising:
an input mechanism, wherein the input mechanism receives data indicative of speech from the patient;
a calculating mechanism, wherein the calculating mechanism calculates, based upon the received data, a maximum intensity function across a plurality of frequencies; and
a determining mechanism, wherein the determining mechanism determines, based at least in part upon a change in intensity between at least two frequencies found in the calculated maximum intensity function, an existence of at least one pathological phenomena associated with the patient;
wherein the maximum intensity function is calculated across the plurality of frequencies by determining, at each of the plurality of frequencies, a maximum of a plurality of sample intensity values of the speech.

22. The system of claim 21, wherein each of the input mechanism, the calculating mechanism and the determining mechanism comprises at least one of computer software and computer hardware.

23. A method for diagnosing a patient, comprising:
receiving data indicative of speech from the patient;
calculating, based upon the received data, an average intensity function across a plurality of frequencies;
calculating, based upon the received data, a maximum intensity function across the plurality of frequencies;
determining, based at least in part upon a change in intensity between at least two frequencies found in the calculated average intensity function and based at least in part upon a change in intensity between at least two frequencies found in the calculated maximum intensity function, an existence of at least one pathological phenomena associated with the patient;
wherein the average intensity function is calculated across the plurality of frequencies by averaging, at each of the plurality of frequencies, a plurality of sample intensity values of the speech; and
wherein the maximum intensity function is calculated across the plurality of frequencies by determining, at each of the plurality of frequencies, a maximum of a plurality of sample intensity values of the speech.

* * * * *